United States Patent [19]

Suys et al.

[11] 4,180,740

[45] Dec. 25, 1979

[54] X-RAY INTENSIFYING SCREENS

[75] Inventors: André R. Suys, Hove; Willy K. Van Landeghem, Sint-Gillis-Waas, both of Belgium

[73] Assignee: AGFA-GEVAERT N.V., Mortsel, Belgium

[21] Appl. No.: 920,665

[22] Filed: Jun. 30, 1978

[30] Foreign Application Priority Data

Jul. 20, 1977 [GB] United Kingdom ............... 30497/77
Aug. 31, 1977 [BE] Belgium .................................. 56201

[51] Int. Cl.$^2$ ........................................... G01M 21/38
[52] U.S. Cl. ..................................... 250/483; 250/486
[58] Field of Search ....................... 250/483, 486, 460; 252/301.4 H, 301.4 S, 301.4 R; 96/82

[56] References Cited

U.S. PATENT DOCUMENTS 4,054,799  10/1977  Wolfe et al. .......................... 250/486
4,109,152  8/1978  Aoki et al. ............................ 250/486

Primary Examiner—Bruce C. Anderson
Attorney, Agent, or Firm—A. W. Breiner

[57] ABSTRACT

An X-ray image intensifying screen is described comprising halide-containing phosphor particles. In order to improve the stability to moisture and thus to protect against loss of fluorescence power the phosphor particles are admixed with, combined with or have reacted with one or more organic substances that are capable of reacting with hydrogen chloride and/or labile halogen. The stability is further improved by admixture of non-hygroscopic halide-free phosphor particles in such a ratio that the ratio of the intensification factor of said screen with respect to the intensification factor of said screen but containing no such halide-free phosphor particles is not smaller than 1:4.

9 Claims, No Drawings

X-RAY INTENSIFYING SCREENS

The present invention relates to improved X-ray image intensifying screens comprising halide containing phosphors and to a process for producing such screens.

The commonly used X-ray intensifying screens comprise a support and a layer of fluorescent particles dispersed in a coherent film-forming macromolecular binder medium. Normally a protective coating is applied on top of the fluorescent layer to shield said layer from ambient influences e.g. moisture, air and mechanical abrasion.

Usually these protective coatings are composed of cellulose derivatives or synthetic polymers as described, e.g., in the U.S. Pat. No. 3,164,719 of Herbert Bauer, issued Jan. 5, 1965.

Generally, layers comprising cellulosic derivatives are somewhat permeable to moisture and therefore more hydrophobic but also more costly synthetic polymers, e.g. polymers containing fluorine atoms, are applied to shield the phosphor layer from moisture.

The protection from moisture is required not only to prevent the fluorescent layer from staining but also to prevent water from contacting the phosphor particles since certain phosphors such as the halide-containing phosphors may react with water and loose thereby their fluorescence power. In the class of the halide-containing phosphors especially the rare-earth oxyhalide phosphors are relatively easily attacked by water so that an intensifying screen containing these phosphors without protection against moisture becomes rapidly useless.

A. L. N. Stevels in Medicamundi 20, 13 (1975) considers the practical use of terbium-doped lanthanum oxybromide phosphor as not being realistic for reason of its hygroscopic character. Our own investigations proved that water reacts with rare-earth oxyhalide phosphors and their fluorescence power becomes impaired or destroyed by hydrolysis. Screens with terbium-doped lanthanum oxybromide phosphor have, however, the advantage that their mainly blue luminescence make them suitable for use with standard X-ray film and no specially matched films have to be developed.

According to the present invention an X-ray image intensifying screen is provided, which screen incorporates halide-containing phosphor particles, and wherein the phosphor particles are afforded a high protection against the influence of moisture and loss of fluorescence power.

The present invention includes also a process for preparing such screens.

The present X-ray image intensifying screen comprises in a binder layer (1) halide-containing phosphor particles that are admixed, combined in contact with or have reacted with one or more organic substances being capable of reacting with hydrogen chloride and/or with labile halogen, e.g. chlorine or bromine, whereby the fluorescence power of said phosphor particles is less prone to be reduced by moisture, and (2) non-hygroscopic halide-free phosphor particles, in such a ratio by weight of (1) to (2) that the ratio of the intensification factor of said screen to the intensification factor of an identical screen containing, however, no non-hygroscopic phosphor particles (2) is not smaller than 1:4.

By "intensification factor" of an X-ray image intensifying screen is understood here the quotient of the X-ray exposure required to produce without the use of an intensifying screen an optical density of 1 on a silver halide film, divided by the X-ray exposure required to produce the same density on the same silver halide film by means of said X-ray image intensifying screen, the conditions of the X-ray irradiation and the conditions of development being the same in both cases.

In general the X-ray image intensifying screens commonly used have an intensification factor of at least 4 at 40 kV and of at least 5 at 150 kV.

One of the features of the X-ray image intensifying screen according to the present invention is that it comprises halide-containing phosphor particles that are admixed, combined in contact with, or have reacted with one or more organic substances that are capable of reacting with hydrogen chloride, e.g. hydrogen chloride scavengers, and/or with labile halogen, e.g. labile chlorine or bromine, e.g. one or more substances containing an anion, preferably an anion with oleophilic group or containing a chemical group, preferably a chemical group with oleophilic character, which anion or group can take part in a displacement reaction wherein labile halogen atoms are replaced by said anion or group.

One single stabilising substance or a mixture or combination of stabilising substances can be used in any screen composition according to the present invention. Preferably the stabilising substance is a colourless organic compound yielding a preferably colourless reaction product on reacting with hydrogen chloride.

According to a first mode with X-ray image intensifying screen according to the present invention comprises halide-containing phosphor particles which have been admixed or combined with or have reacted with one or more metal organic compounds that are hydrogen halide scavengers and/or are capable of replacing labile halogen by an organic group. Within this category of metal organic compounds very good results have been obtained with organic metal salts and organometallic compounds.

According to a second mode the X-ray image intensifying screen according to the present invention comprises halide-containing phosphor particles, which are mixed with, combined in contact with, or have reacted with at least one organic compound in such a way that the fluorescing power of the phosphor particles are less susceptible to the deleterious influence of humidity and wherein said organic compound is a non-metal organic compound corresponding to one of the following general formulae:

$$R-X \text{ and } X-R^1-X$$

wherein

R represents a monovalent organic group, preferably of at least 6 carbon atoms, e.g. a hydrocarbon group, $R^1$ represents a bivalent organic group, preferably of at least 6 carbon atoms, e.g. a bivalent hydrocarbon group, with the proviso that these groups contain no reactive hydrogen such as contained in X, and X represents a group containing reactive hydrogen, with which said compound by reacting with acetyl chloride is capable of splitting off chlorine therefrom in the form of hydrogen chloride in the circumstances of the test A below, e.g. mercapto, a primary or secondary amino group, carboxyl or hydroxyl, and wherein said compound at 15° C. has a solubility of no more than 5 g in 100 ml of water.

In the formula X—R$^1$—X the groups X may be the same or different chemical groups.

The term "hydrocarbon" used herein includes straight-chain, branched-chain or ring-closed hydrocarbon as well as saturated or unsaturated hydrocarbon. Most preferably the hydrocarbon group has from 8 to 20 carbon atoms.

TEST A

Stoichiometric amounts of acetyl chloride and of the organic compound to be examined are dissolved in anhydrous benzene and heated herein for 24 h in the presence of a stoichiometric amount of pyridine. The pyridinium chloride formed is separated from the cooled reaction mixture (20° C.) by filtering or centrifuging. If pyridinium chloride crystals happen to be contained in the cooled reaction mixture, the compound meets the demand, viz. to be usable as a stabilising agent in the present invention.

If the organic compound to be examined is a primary or secondary amine, pyridine may be omitted from the reaction mixture and the chlorides corresponding with these amines form in the reaction.

Pyridine is normally used as hydrogen chloride scavenger in alcoholysis (see John H. Billman and Elisabeth S. Cleland in Methods of Synthesis in Organic Chemistry—Edward Brothers, Inc. Ann Arbor, Mich., U.S.A. (1951) 78. The use of pyridine as condensing agent in the preparation of acid anhydrides starting from a carboxylic acid chloride and a carboxylic acid has been described by Wagner and Zook, Synthetic Organic Chemistry—John Wiley and Sons (1953) 558.

Suitable non-metal organic compounds are non-metal organic compounds according to the above general formulae wherein X is a mercapto group, a primary or secondary amino group, a carboxyl group or a hydroxyl group, which is linked to an aliphatic group or aromatic nucleus.

Upon manufacturing X-ray image intensifying screens, the above mentioned compounds with reactive hydrogen are preferably used in binder compositions containing no splittable halogen atom, thus preferably not in combination with halogenated mono-olefinic organic hydrocarbon polymers or copolymers such as vinyl chloride homopolymers and copolymers. As is generally known, the presence of hydrogen chloride enhances the decomposition of poly(vinyl chloride).

Other suitable non-metal organic compounds for stabilising the halide-containing phosphors against moisture are organic compounds from which organic compounds with active hydrogen can be formed by hydrolysis, e.g. organic acid anhydrides, esters, amides and nitriles. Preferably these compounds contain long chain ($C_8$–$C_{20}$) hydrocarbon groups as e.g. in hexadecenylsuccinic anhydride, lauric acid methyl ester, stearic acid methyl ester, stearamide and stearonitrile. These compounds are capable of forming with water in situ in the screen composition substances within the scope of the above general formulae.

A preferred optional feature resides in the employment of a substance or mixture of substances which reduce the adverse effects of moisture on the halide containing phosphor and which protective power satisfies a certain test. This test (hereafter called the "Standard Test") has been devised for the purpose of assessing the level of effectiveness of any selected substance for the protection of the halide-containing phospor in accordance with the invention and is as follows:

STANDARD TEST (1) An X-ray image intensifying screen (Screen A) is prepared from the following composition:

| | |
|---|---|
| terbium-activated lanthanum oxybromide phosphor | 100 g |
| stabilizing substance (compound or combination of compounds) to be tested | 0.5 g |
| poly(vinyl-n-butyral) containing 12% by weight of non-acetalized vinyl alcohol units and having an average molecular weight of 50,000 | 12.5 g |
| ethylene glycol monomethyl ether | 48 g | by ball-milling to reduce the particle size to 7 NS Hegman Fineness measured with a Hegman gauge as specified in ASTM 1210, filtering the resulting dispersion, de-aerating it and applying the composition to a barytacoated paper of 290 g per $m^2$ at a coverage of 500 g/$m^2$.

(2) A second X-ray image intensifying screen (screen B) is prepared in the same way as screen A except that the substance to be tested is omitted.

(3) Screen A is treated with moisture by applying onto the phosphor layer of the screen a wet circular piece of filter paper having a dry weight of 1.355 g, a diameter of 15 cm and a water content of 3.100 g, airtightly enclosing the screen A together with the applied filter paper in a polyethylene bag, keeping the bag for 64 h at 60° C. in a ventilated cabinet and then removing the screen from the bag, removing the filter paper and drying the screen in air for 30 min at 80° C.

(4) The screens A and B (the former having been moisture-treated as above described) are subjected to an X-ray exposure while the phosphor layers are in contact with distinct areas of the same silver halide emulsion layer of a photographic material having a transparent emulsion layer support and the exposed photographic material is developed, the X-ray exposure and development being such that in the area of the emulsion layer which was in contact with screen B a spectral density of at least 1.00 above inherent fog is obtained; and the composition of the silver halide material and the development being such that gradually increasing exposures of the silver halide emulsion area in contact with screen B would give a silver image density versus log exposure curve having a gamma value (maximum gradient of the characteristic curve) of 3;

(5) the densities $D_A$ and $D_B$ obtained in the areas of the emulsion layer, which were exposed in contact with screens A and B are measured;

(6) the actual loss of fluorescent light-emitting power of the moisture-treated screen A is computed on the basis of the spectral densities $D_A$ and $D_B$ measured in step 5 above and the gamma value 3.

If screen B in the Standard Test were to be moisture-treated like screen A before being subjected to the exposure and development, moisture-treated screen B would show a fluorescent power of less than 10% relative to that of the non-moisture-treated screen B.

A compound or combination of compounds is regarded as satisfying the above Standard Test if the result of the determination in step 6 is that the fluorescent light-emitting power of screen A incorporating that compound or combination of compounds is at least 25% of that of the non-moisture treated screen B. In the most preferred embodiment of the invention the compound or compounds affording the moisture protection is or are such that when such compound or compounds is or are used in screen A in the Standard Test the fluorescent light-emitting power of screen A is at least 65% and most preferably at least 75% of that of the non-moisture treated screen B.

According to a first embodiment use is made as stabilizing substance of at least one metal-organic compound, which is preferably colourless and preferably yields a colourless reaction product by reaction with hydrogen chloride.

Metal-organic compounds suitable for use according to the present invention are, organic metal salts, e.g. metal salts of carboxylic acids, so-called metal carboxylates. Preference is given to water-insoluble carboxylates of an aliphatic carboxylic acid having preferably at least 7 carbon atoms, e.g. of a bi- or trivalent metal, e.g. barium, lead, cadmium or zinc salts. For example lead stearate, barium stearate, barium 2-ethylhexaoate, cadmium laurate, zinc laurate or zinc stearate.

For the preparation of such compounds reference is made to the J.Polymer Sci. Vol. XL (1959) p. 420.

The stabilizing activity of these substances is assumed to be in their ability to replace labile halogen e.g. chlorine, bromine, or iodine by the acyloxy group —OCOR where R represents an organic group that hydrophobizes the halide-containing phosphor onto which it has been attached.

Further are to be mentioned zinc salts of acids derived from phosphorus of the type described e.g. in the U.S. Pat. No. 3,396,144.

Other metal-organic compounds for stabilizing purposes according to the present invention are water-insoluble mercaptides e.g. a tin mercaptide corresponding to the following general formula:

wherein R is a hydrocarbon group, preferably a hydrocarbon group containing at least 4 carbon atoms, e.g. n-butyl.

It is assumed that in the stabilization the oleophilic R-S-group is chemically attached to the phosphor particle containing labile halogen atoms in the form of halide anions and that an exchange of halogen takes place, the mercapto group providing a water-repelling character to the phosphor particle, to which it is chemically bound at its surface.

Metal dialkyl mercaptides are prepared e.g. as described by Donald J. Cram and George J. Hammond in their book Organic Chemistry 2nd ed. (1964) McGraw-Hill Book Company Inc. New York, p. 552.

An interesting subclass of metal-organic compounds that satisfy the Standard Test comprises the organometallic compounds that can react with a labile or weakly bound halogen substituent e.g. as present in a hydrolyzable halide and/or can react with hydrogen chloride.

According to a second embodiment use is made of organotin compounds, organoantimony and organobismuth compounds. Many of them are known as hydrogen chloride- or hydrogen bromide-scavenger or are known for the slow-down of thermal degradation of poly(vinyl chloride). Examples of such compounds are triphenylantimony, triphenylbismuth and tetraphenyltin.

A suitable class of organotin compounds corresponds to the following formula:

wherein:
R is a hydrocarbon group, e.g. an alkyl group,
X is 1 to 3 electronegative substituents e.g. oxygen in substituted form as in an alkoxy or in a carboxylate group, or is an electronegative sulphur substituent or a sulphur-containing substituent linked through sulphur to the tin atom e.g. a thioether, a mercaptide or xanthate group, and
m is 1, 2, or 3, excluding X being three, two, or one halogen atom(s) when m is 1, 2 or 3 respectively.

Preferred organo tin stabilizing compounds are dialkyltinmercaptides, especially the organotin compounds that are within the scope of one of the following general formulae:

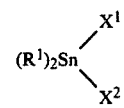

wherein
$R^1$ represents an alkyl group e.g. butyl including a substituted alkyl group such as a benzyl or phenethyl group,
each of $X^1$ and $X^2$, which may be the same or different, represents $$-O-\underset{\underset{O}{\|}}{C}-R^2$$

or —S—$R^3$, wherein $R^2$ is alkyl including substituted alkyl e.g. alkyl substituted by —S—$R^4$ wherein $R^4$ is hydrogen or alkyl, and $R^3$ is alkyl including substituted alkyl e.g. alkyl substituted by $$-\underset{\underset{O}{\|}}{C}OR^4$$

wherein $R^4$ has the same meaning as above;

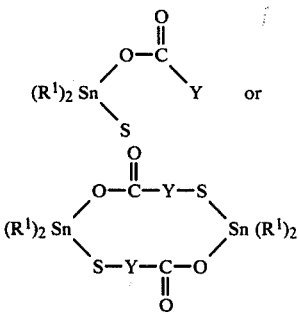

wherein:
$R^1$ has the same meaning as described above, and
Y represents an alkylene group e.g. an ethylene group.

Specific examples of preferred compounds are dibutyl tin bis(oxooctyl thioglycolate), also called dibutyltin S,S'-bis(n-octylmercapto acetate) and

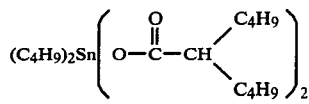

which compounds are described as stabilizing agents for polyvinyl chloride by D. H. Solomon, The Chemistry of Organic Film Formers, John Wiley & Sons, Inc. New York, p. 175 to 177 (1967) and dibutyltin maleate, dibutyltin lauryl mercaptide, and di(n-octyl)-tin, S,S-bis(isooctylmercapto acetate) which are described by Kirk-Othmer, Encyclopedia of Chemical Technology, 2nd compl. revised edition, Vol. 21, p. 390 (1965) and dibutyltin (β-mercapto propionate) described in J.Polymer Sci. Part A Vol. 2 (1964) 1801–1813.

Organo-metallic compounds suitable for use according to the invention are further described in the U.S. Pat. Nos. 2,914,506 of Gerry P. Mack, Jackson Heights and Emery Parker, issued Nov. 24, 1959, 2,888,435 of James M. Wallace, Jr. issued May 26, 1959, 2,801,258 of Ernest W. Johnson, issued July 30, 1957, 2,789,102 of Elliott L. Weinberg, 2,789,103 of Elliott L. Weinberg and Louis A. Tomka, 2,789,104 of Hugh E. Ramsden, Elliott L. Weinberg and Louis A. Tomka, 2,789,105 of Louis A. Tomka and Elliott L. Weinberg, all issued Apr. 16, 1957, 2,726,227 and 2,726,254 both of William E. Leistner and Olga H. Knoepke, issued Dec. 6, 1955, in British Pat. Nos. 719,421 filed Dec. 1, 1954 by Metal & Thermit Corp., 728,953 filed Apr. 27, 1955 by Firestone Tire & Rubber Co., 782,483 filed Sept. 4, 1957 by Wacker-Chemie G.m.b.H., 838,502 filed June 22, 1960 by Argus Chemical Corp., and 1,018,111 filed Apr. 24, 1961 by Pure Chemicals Limited, a British Company.

Other suitable organo metallic compounds, e.g. dibutyltin sulphide, are also described under the heading "Physical constants of organometallic compounds" in CRC Handbook of Chemistry and Physics 55th Ed. (1974–1975) CRC Press, Inc., Cleveland, Ohio, U.S.A.

According to a third embodiment use is made of non metal-organic compounds as referred to hereinbefore, wherein reactive hydrogen is directly bound to sulphur, e.g. in thiols. Preferably thiols are used that contain a hydrocarbon group of at least 6 carbon atoms. Such thiols including aliphatic as well as aromatic representatives have been described by Arthur I. Vogel, Textbook of Practical Organic Chemistry, Longmans 3rd ed. (1959) p. 502. Excellent results are obtained with 1-n-dodecane thiol (laurylmercaptan).

According to a fourth embodiment use is made of non-metal organic compounds as referred to hereinbefore, which contain the reactive hydrogen in an amino group, i.e. primary or secondary amines. Preferably aliphatic primary or secondary amines are used that contain a hydrocarbon group of at least 8 carbon atoms. Good results are obtained with 1-n-dodecylamine (laurylamine).

According to a fifth embodiment use is made of non-metal organic compounds as referred to hereinbefore, which contain the reactive hydrogen in a carboxyl group. Preferably aliphatic carboxylic acids are used that contain a hydrocarbon group of at least 6 carbon atoms. Excellent results are obtained with dodecanoic acid (lauric acid), but aliphatic carboxylic acids containing more than one carboxyl group are considered too, e.g. hexadecylenesuccinic acid, octadecylsuccinic acid, as well as carboxylic acids substituted with a hydroxyl group or a mercapto group, e.g. 12-hydroxystearic acid.

According to a sixth embodiment use is made of non-metal organic compounds as referred to hereinbefore, which contain the reactive hydrogen in a hydroxyl group, which is preferably linked to a hydrocarbon group of at least 6 carbon atoms as e.g. in lauryl alcohol, p-t-amylphenol and isohexadecyl alcohol.

The hydrocarbon groups as referred to hereinbefore may comprise substituents that do not enhance the water-solubility of the organic compounds beyond the already given value. Suitable substituents rendering the compounds more hydrophobic are halogen atoms, e.g. fluorine, chlorine and bromine, such as e.g. in p-bromophenol and perfluorocaprylic acid.

Preferably non-metal organic compounds are used that are colourless and upon reaction with the phosphor yield a colourless hydrophobic reaction product at the surface of the phosphor particles.

Another feature of the X-ray image intensifying screen according to the present invention is that the halide-containing phosphor particles, which are already to some extent protected against loss of fluorescnce power by moisture by the above defined substance(s) are admixed with non-hygroscopic halide free fluorescent pigment particles in the amount given.

These halide free fluorescent pigment particles are preferably such that after having been stored for 64 h under conditions of 80% relative humidity and 25° C., they show a weight increase by uptake of water of at most 0.1%.

Halide-free phosphor particles that are suited for use according to the present invention are calcium tungstate, terbium-doped gadolinium oxysulphide ($Gd_2O_2S:Tb$), terbium-doped lanthanum oxysulphide ($La_2O_2S:Tb$) and terbium-doped yttrium oxysulphide ($Y_2O_2S:Tb$).

According to a preferred embodiment the halide-free phosphor particles substantially emit in the spectral range wherein the halide-containing phosphor emits. For example blue light emitting calcium tungstate phosphor particles are used in admixture with blue-light emitting rare earth oxyhalide phosphor particles.

Therefore the invention is particularly concerned with X-ray image intensifying screens including as halide-containing phosphor particles rare-earth oxyhalide phosphor particles containing e.g. as host metal lanthanum and/or gadolinium and one or more other rare-earth metals as activator metal.

The activator metal is preferably terbium or thulium. Optionally cerium, ytterbium, erbium and/or yttrium are used as activator metal preferably in combination with terbium.

Blue-light-emitting phosphors suited for use according to the present invention are within the scope of the following general formula:

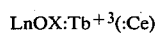

$$LnOX:Tb^{+3}(:Ce)$$

wherein:
Ln is one or more of lanthanum or gadolinium,
X is one or more of chlorine, bromine or iodine,
$Tb^{+3}$ being present in activator concentration up to about 30 mole% of the composition, e.g. between 0.01 to 0.6 mole %, and Ce being optionally present in the range of about 0.1 to 1.0 mole %.

The halogen X is preferably present in the range of between the stoichiometric amount and about 2.5% deviating thereof.

Preferred rare-earth oxyhalide phosphors include ytterbium as impurity and have the following general formula:

$$M_{1-w-y}OX:Tb_w^{3+}Yb_y$$

wherein:
M is an element selected from the group consisting of lanthanum and gadolinium,
X is an element selected from the group consisting of chlorine and bromine, and
w is from 0.0005 to 0.03 mole per mole of the selected oxyhalide, and
y is from 0.00005 to 0.005 mole per mole of the selected oxyhalide.

Phosphors according to the above formulae and their preparation are described in the U.S. Pat. No. 3,617,743 and reissued U.S. Pat. No. 28,592 respectively.

Other particularly useful rare-earth oxyhalide phosphors contain lanthanum and/or gadolinium as host metal and thulium as activator metal. Such phosphors are described in the U.S. Pat. No. 3,795,814 and are stated to have a relative speed of more than 3 with respect to calcium tungstate.

In rare-earth metal oxyhalide phosphors a part of the halide may be fluoride e.g. as is present in a mixed crystal compound having the following general formula and whose preparation is described in the published German patent application No. 2,329,396:

$$LaOFX:Ce(:Y)$$

wherein:
X is halogen other than fluorine,
Ce being present in activator concentration, e.g. from $10^{-4}$ to $10^{-2}$ gram atom/mole of LaOFX, and
Y is at least one of the rare-earth elements terbium and erbium in an amount of 0 to $10^{-2}$ gram atom/mole of LaOFX.

Other suitable rare-earth oxyhalide phosphors contain gadolinium as host metal and yttrium and cerium as activator metal. These phosphors are described in the published German patent application No. 2,540,344 and correspond to the following general formula:

$$GdOBr:Y(:Ce)$$

wherein:
Y is present in an amount of 0 to $10^{-1}$ gram atom/mole of GdOBr, and
Ce is present in an activating amount, preferably from $10^{-4}$ to $10^{-2}$ gram atom/mole of GdOBr.

These phosphors are less hygroscopic than the phosphors according to the first two general formulae mentioned above.

Terbium-activated lanthanum oxybromide phosphors modified for the elimination of afterglow may also be used. Such phosphors have been described in the published German patent application No. 2,461,260. In these phosphors part of the lanthanum is replaced by lead and/or thallium.

Other useful halide-containing phosphor particles are e.g. barium fluoride chloride activated with europium (II) described e.g. in French Patent Specification No. 2,185,667, filed May 23, 1973 by Philips Gloeilampenfabrieken N.V. and cesium iodide phosphors e.g. cesium iodide activated with sodium or thallium (see e.g. U.S. Pat. No. 3,836,784).

The amount of stabilizing substance or mixture of stabilizing substances suitable for a practically useful increase in stability against moisture of the applied halide-containing phosphor particles may be determined by simple tests.

Preferably the stabilizing substance(s) is (are) combined by admixture with the halide-containing phosphor particles in a chosen phosphor binder layer combination in an amount sufficient to maintain the fluorescent light-emitting power of the layer in a moisture treatment as defined above for screen (A) at a level of at least 75% of the level before said treatment.

Effective amounts of stabilizer(s), e.g. for use in admixture with lanthanum oxybromide phosphors, are in the range of 0.05 to 10 g per 100 g of phosphor.

The non-hygroscopic halide free phosphor particles are admixed with the halide-containing phosphor particles in a ratio by weight that fulfils the requirements of the intensification factor ratio as defined hereinbefore, preferably an intensification factor ratio of 1:1.

More particularly, X-ray image intensifying screens of the present invention preferably contain in a phosphor-binder layer a mixture of calcium tungstate phosphor particles and rare-earth oxyhalide phosphor particles in a weight ratio range from 60:40 to 90:10 and the phosphor binder layer has a rare-earth oxyhalide coverage between about 100 and about 250 g per sq.m. A preferred ratio by weight of rare-earth oxyhalide phosphor to calcium tungstate phosphor is 1:2 e.g. 150 g of rare-earth oxyhalide phosphor and 300 g of calcium tungstate per sq.m.

The particle size of the phosphors used in the screen of the present invention is preferably between 0.1 $\mu$m and about 20 $\mu$m, more preferably between 1 $\mu$m and 12 $\mu$m, this range embodying about 80% by volume of the phosphors present in said screen.

Suitable binders for use in the preparation of the phosphor layer are, e.g., a cellulose acetate butyrate, polyalkyl (meth)acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl chloride/vinyl acetate/vinyl alcohol) or mixture thereof. The preferred binders are halogen-free polymers or copolymers. The metal organic stabilizing substances having hydrogen chloride-scavenging properties can be used advantageously in combination with any type of binding agent whether it contains halide substituents or not.

To provide high X-ray efficiency it is preferably that a minimum amount of binder be employed in the phosphor layer. However, the less binding agent the more brittle the layer, so that a compromise has to be made.

The thickness of the supported phosphor layer is preferably in the range of 0.05 to 0.5 mm.

The coverage of the phosphor mixture is preferably in the range from about 300 to 750 g/sq.m.

For the preparation of the X-ray intensifying screen according to the present invention the halide-containing phosphor particles, the stabilizing substance(s) and the non-hygroscopic halide-free phosphor particles are intimately dispersed in a solution of the binder and then coated upon a support. Alternatively, the halide-containing phosphor particles are first allowed to come in intimate contact with said stabilizing substance(s) in an organic liquid medium e.g. a solution of the binder, to cause the stabilizing substance to contact the halide containing phosphor particles, this can be done by dispersing both ingredients in the organic liquid medium and thoroughly mixing in a ball mill. Thereupon the dispersion is admixed with a dispersion of the non-hygroscopic halide-free phosphor particles made in the same way. The mixture, if necessary after adjustment of the binder content, can then be coated on the support and dried.

It is also possible to contact the halide-containing phosphor particles with the stabilizing substance(s) before dispersing in the binder solution e.g. dispersing the phosphor particles in an organic solution of the stabilizing substance(s) followed by removal of the solvent(s) e.g. separating the phosphor particles from the solution and then drying. The thus treated phosphor particles and the non-hygroscopic halide-free phosphor particles can then be dispersed together in a binder solution or they can be dispersed in separate binder solutions and the dispersions then mixed.

The coating of the present phosphor binder layer, which is preceded by the thorough dispersing and mixing of the halide-containing phsophor particles and non-hygroscopic halide-free phosphor particles in a binder solution, may proceed according to any usual technique, e.g. by spraying or dip-coating. After coating, the solvent(s) of the coating mixture is (are) removed by evaporation, e.g. by drying in an air current of 60° C.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm3 of dry coating).

Self-supporting screens of this invention can be prepared e.g. by means of "hot-pressing", excluding the use of solvent(s) in the manufacture of the screens.

In preparing an intensifying screen according to the invention the phosphor-pigment mixture binder composition may be coated on a wide variety of supports, e.g. cardboard and plastic film, e.g. polyethylene terephthalate film. The supports used in the fluorescent screens of the present invention may be coated with (a) subbing layer(s) for improving the adherence of the phosphor coating thereto.

Optionally, a light-reflecting layer is provided between the phosphor-containing layer and its support to enhance the exposure of the silver halide emulsion material. Such light-reflecting layer may contain white pigment particles dispersed in a binder, e.g. titanium dioxide particles, or may be made of a vapour-deposited metal layer, e.g. an aluminum layer having a high reflection power for ultraviolet radiation and blue light.

The image sharpness obtainable with a fluorescent screen silver halide material system can be improved considerably by incorporating a fluorescent light-absorbing dye, called "screening dye", into the fluorescent screen material. As the oblique radiation covers a large path in the screen material, it is attenuated by the screening dye or dyes to a greater extent than the radiation impinging normally. The term "screening dye" used herein includes dyestuffs (i.e. coloured substances in molecularly divided form) as well as pigments.

Diffuse radiation reflecting from the support of the fluorescent screen material can be mainly attenuated in an anti-reflection layer containing the screening dyes subjacent to the fluorescent layer.

The screening dye does not have to be removed from the fluorescent screen material and may therefore be any dye or pigment absorbing in the emission spectrum of the fluorescent substance(s). Thus black substances such as carbon black particles of an average size of 0.15 to 0.60 μm incorporated in said anti-reflection layer or the phosphor layer yield quite satisfactory results.

To the phosphor-containing layer a protective coating may be applied preferably having a thickness in the range of 5 to 25 μm and comprising a film-forming polymeric material that is photographically inert towards a silver halide emulsion layer.

Polymeric materials suitable for that purpose include e.g. cellulose derivatives (e.g. cellulose nitrate, cellulose triacetate, cellulose acetate propionate, cellulose acetate butyrate), polyamides, polystyrene, polyvinyl acetate, polyvinyl chloride, silicone resins, poly(acylic ester) and poly(methacrylic ester) resins, and fluorinated hydrocarbon resins, and mixtures of the foregoing materials. Representative examples of various individual members of these binder materials include the following resinous materials: poly(methyl methacrylate), poly(n-butyl methacrylate), poly(isobutyl methacrylate), copolymers of n-butyl methacrylate and isobutyl methacrylate, copolymers of vinylidene fluoride and hexafluoropropylene, copolymers of vinylidene fluoride and trifluorochloroethylene, copolymers of vinylidene fluoride and tetrafluoroethylene, terpolymers of vinylidene fluoride, hexafluoropropylene, and tetrafluoroethylene, and poly(vinylidene fluoride).

According to another embodiment of the present X-ray image intensifying screen, a protective layer is applied which contains a crosslinked polymer mass obtained by an acid-catalyzed reaction of a polymer or mixture of polymers containing reactive hydrogen atoms and a crosslinking agent, the crosslinking agent being an organic compound containing a plurality of etherified N-methylol groups.

According to a special embodiment the outer face of the screen intended for contact with the photographic silver halide emulsion material may contain a solid particulate material that has a static friction coefficient ($\mu$) at room temperature (20° C.) of less than 0.50 on steel as described in the published German patent application No. 2,616,093.

Antistatic substances can be applied to the screen to reduce the risk of electrical potential differences resulting in sparking. For example, the screens are treated with the "ANTI-STAT" 6 spray, which leaves an odourless transparent antistatic deposit. ANTI-STAT is a trade name of Braun Laboratories Div. Barrett Chemical Co. Inc., Philadelphia, Pa., U.S.A.

The fluorescent X-ray image intensifying screens of the present invention will normally be used in conjunction with light-sensitive silver halide materials emulsion-coated on one or both sides of the support.

In order to exclude local defects in the form of developable centres in the silver halide film used in conjunction with an X-ray image intensifying screen containing rare earth-metal phosphor particles e.g. rare-earth oxyhalide phosphor particles including traces of radioactive elements, the screen may contain a light-diffusing layer or sheet, which contains numerous discrete light-scattering volumes of a substance or substances distributed at random in a binder medium or partially embedded therein, such volumes having a mean size not larger than 20 μm, said layer or sheet being located so that fluorescent light of said phosphor particles can penetrate therethrough to the outside of said screen.

Such screen has been described in the published German patent application No. 2,709,664 which has to be read in conjunction herewith.

The following examples illustrate the present invention without, however, limiting it thereto. All parts, percentages and ratios are by weight unless otherwise stated.

EXAMPLE 1

Preparation of screen P 100 g of terbium-activated lanthanum oxybromide phosphor, 0.5 g of the stabilizing compound dibutyltin-(β-mercapto propionate), 12.5 g of VINYLITE VAGH (trade name of Union Carbide and Carbon Corp., New York, U.S.A.) for a copoly(vinyl chloride/vinyl acetate/vinyl alcohol) (91/3/6 by weight) dissolved in 48 g of methyl ethyl ketone were ball-milled to a fineness of grind corresponding with 7 NS Hegman Fineness-of-Grind measured with the Hegman gauge as specified in ASTM D1210, whereupon the dispersion obtained was filtered and after de-aeration coated onto a baryta-coated paper of 290 g per sq.m at a coverage of 150 g of phosphor per sq.m to form screen P.

The phosphor layer was overcoated with a protective coating from a 7.5% solution in ethyleneglycol monomethyl ether of cellulose acetate butyrate having a degree of substitution (DS) of acetyl 1.31 and a DS of butyryl of 1.51. The dried protective coating had a coating weight of 10 g per sq.m.

Preparation of screen Q

The X-ray image intensifying screen Q was manufactured as described for screen P with the difference that the stabilizing compound was omitted from the composition of the screen.

Preparation of screen R

The X-ray image intensifying screen R was manufactured as described for screen P with the difference that before coating the oxybromide phosphor dispersion was mixed with a calcium tungstate phosphor dispersion prepared as described for the lanthanum oxybromide phosphor dispersion of screen P with the only difference that the oxybromide phosphor was replaced by a same amount of calcium tungstate. The calcium tungstate phosphor dispersion was added in an amount such that the final dispersion contained the oxybromide phosphor and calcium tungstate phosphor in a ratio of 1:2.

The phosphor mixture dispersion was coated on the same support as described for screen P at a phosphor mixture coverage of 150 g of terbium-activated lanthanum oxybromide phosphor and 300 g of calcium tungstate per sq.m.

Moisture Treatment

The moisture treatment of screens, P, Q and R processed by incubation in a cabinet having inside an atmosphere of 85% relative humidity at 20° C. Said incubation treatment was effected for a period of 2 weeks. After that period the fluorescence power of screen Q was completely lost and screen P showed randomly distributed spots and small craters. Screen R did not show any trace of deterioration. When screens P and R were X-ray exposed in contact with separate strips of the same silver halide emulsion film the developed film strip exposed in combination with screen P showed more than 100 white spots per sq.dm whereas the developed film strip which was exposed in contact with screen R did not show any spots at all and was evenly blackened.

The ratio of the intensification factors of screens P and R was 1:1.

EXAMPLE 2

Preparation of screen K

This intensifying screen was prepared as screen P of example 1, with the difference that 0.5 g of lauryl alcohol was used as stabiliser.

Preparation of screen L

This intensifying screen was prepared as screen Q of example 1, and differs from screen K in that the stabiliser was omitted from the screen composition.

Preparation of screen M

The intensifying screen was prepared as screen K, with the difference that before the application of the oxybromide phosphor dispersion the latter was mixed with a calcium tungstate phosphor dispersion prepared as described for the lanthanum oxybromide phosphor dispersion of screen K, with the only difference that the oxybromide phosphor was replaced by an equal weight of calcium tungstate. Then the prepared calcium tungstate phosphor dispersion was added in such an amount to the lanthanum oxybromide dispersion that the final dispersion contained the oxybromide phosphor and the calcium tungstate phosphor in a ratio by weight of 1:2.

The phosphor mixture dispersion was coated on the same support as described for screen K at a phosphor mixture coverage of 150 g of terbium-activated lanthanum oxybromide phosphor and 300 g of calcium tungstate per sq.m.

Moisture Treatment

The moisture treatment of screens K, L and M proceeded by incubation in a cabinet having inside an atmosphere of 85% relative humidity at 20° C. Said incubation treatment was effected for a period of 2 weeks. After that period the fluorescence power of screen L was completely lost and screen K showed randomly distributed spots and small craters. Screen M did not show any trace of deterioration. When screens K and M were X-ray exposed in contact with separate strips of the same silver halide emulsion film the developed film strip exposed in combination with screen K showed more than 100 white spots per sq.dm, whereas the developed film strip that was exposed in contact with screen M did not show any spots at all and was evenly blackened.

The ratio of the intensification factors of screens K and M was 1:1.

Analogous results were obtained by replacing 0.5 g of lauryl alcohol in the compositions of screens K and M by a same amount of laurylmercaptan and lauric acid respectively. A usable result was obtained by replacing in the compositions of screens K and M the lauryl alcohol by a same amount of 1-n-dodecylamine.

EXAMPLE 3

In order to have a quick check on the stabilizing properties of a particular compound the following test was developed.

In a round-bottomed flask of 2 l provided with a reflux condenser and containing a boiling chip 750 ml of water were heated up to boiling. Inside the cooling tube of this condenser a flexible wire ending in a stainless steel hook was introduced. A strip of intensifying screen (measuring 2.5 cm×7 cm) to be tested was fixed to the hook so that the test material did not touch the water surface. After a certain treating time (30, 60, 120 and 240 min) the test strip was taken out of the flask and dried at 80° C. for 30 min. Thereupon an X-ray record was made using the thus treated test strip together with an identical but non water vapour-treated strip in contact with a same silver halide photographic material, the X-ray exposure and development being the same for both of the exposed portions of the photographic material.

The photographic material used in the contact exposure with the screen strips was a CURIX RP-1 film (CURIX is a registered trade mark of AGFA-GEVAERT N.V. for a medical X-ray film).

The X-ray exposure proceeded for all the test strips at 80 kV tube voltage. The silver halide film exposed in adjacent area with the fluorescent light of a pair of water-vapour-treated and non-water-vapour-treated screen strips was subjected to development in the Agfa-Gevaert's hardening developer G138 which contains hydroquinone and 1-phenyl-3-pyrazolidinone as developing agents and glutardialdehyde as hardening agent.

The optical densities obtained in the film area corresponding with each of the screen strips were noted and are listed in the following table.

TABLE

| Stabilizing compound | Optical density of developed film exposed in contact with the screen | | | | |
|---|---|---|---|---|---|
| | non-water-vapour-treated | water-vapour-treated | | | |
| | | 30 min | 60 min | 20 min | 240 min |
| none | 1.56 | 1.56 | 1.39 | 1.35 | 0.75 |
| triphenylantimony | 1.39 | 1.33 | 1.33 | 1.30 | 1.32 |
| dibutyltin sulphide | 1.53 | 1.53 | 1.53 | 1.53 | 1.53 |
| zinc stearate | 1.42 | 1.37 | 1.35 | 1.34 | 1.37 |
| dibutyltin (β-mercaptopropionate) | 1.54 | 1.54 | 1.54 | 1.54 | 1.54 |
| laurylmercaptan | 1.52 | 1.49 | 1.44 | 1.47 | 1.40 |
| lauric acid | 1.09 | 1.09 | 1.09 | 1.09 | 1.09 |
| lauryl alcohol | 1.33 | 1.33 | 1.26 | 1.20 | 1.10 |
| lauryl amine | 1.20 | 1.03 | 0.96 | 0.95 | 0.90 |
| lauronitrile | 1.10 | 1.10 | 1.10 | 1.10 | 1.10 |
| stearamide | 1.58 | 1.55 | 1.46 | 1.43 | 1.40 |
| p-bromophenol | 1.72 | 1.67 | 1.67 | 1.62 | 1.52 |
| diphenylmercaptan | 1.26 | 1.26 | 1.24 | 1.25 | 1.26 |
| lauric acid methyl ester | 1.62 | 1.61 | 1.53 | 1.41 | 1.30 |
| stearic acid methyl ester | 1.91 | 1.77 | 1.80 | 1.71 | 1.66 |
| hexadecyl succinic anhydride | 1.55 | 1.39 | 1.42 | 1.37 | 1.29 |

The screens were prepared as follows:

100 g of terbium-activated lanthanum oxybromide phosphor, 0.5 g of the stabilizing compound mentioned in the Table, 12.5 g of binder consisting of 60 parts of poly (n-butyl methacrylate) and 40 parts of polyethyl acrylate and 48 g of ethylene glycol monomethyl ether were ball-milled to a fineness of grind corresponding with 7 NS Hegman Fineness-of-Grind measured with the Hegman gauge as specified in ASTM D 1210.

A calcium tungstate phosphor dispersion was prepared in the same way as the above lanthanum oxybromide phosphor dispersion and the calcium tungstate phosphor dispersion added in such an amount to the lanthanum oxybromide phosphor dispersion that the final dispersion contained the lanthanum oxybromide phosphor and calcium tungstate phosphor in a ratio of 1:2.

The phosphor mixture dispersion thus obtained was coated onto a baryta-coated paper of 290 g per sq.m at a coverage of about 450 g of phosphor per sq.m.

The phosphor layer was overcoated with a protective coating from a 7.5% solution in ethylene glycol monomethyl ether of cellulose acetate butyrate having a degree of substitution (DS) of acetyl 1.31 and a DS of butyryl of 1.51. The dried protective coating had a coating weight of 10 g per sq.m.

Preferred stabilizing agents for use according to the present invention are those that in the circumstances of the above quick check wherein said phosphor combination is used in an intensifying screen protect the fluorescence power of that screen to such a degree that the optical density value obtained with the water-vapour-treated screen after the 240 min treatment is not lowered by a value larger than 0.6, most preferably not larger than 0.3, with respect to the optical density value obtained with the non-water-vapour-treated screen.

We claim:

1. An X-ray image intensifying screen comprising in dispersed form in a binder layer:
   (1) halide-containing phosphor particles that are admixed, combined in contact with, or have reacted with one or more organic substances being capable of reacting with hydrogen chloride and/or with labile halogen, whereby the fluorescence power of said particles is less prone to be reduced by moisture, and
   (2) non-hygroscopic halide-free phosphor particles in such a ratio by weight of (1) to (2) that the ratio of the intensification factor of said screen to that of an identical screen containing, however, no non-hygroscopic phosphor particles (2) is not smaller than 1:4.

2. An X-ray image intensifying screen according to claim 1, wherein the organic substance is an organic metal salt or an organometallic compound.

3. An X-ray image intensifying screen according to claim 1, wherein said organic compound is a non-metal organic compound corresponding to one of the following general formulae:

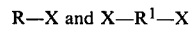

R—X and X—R¹—X wherein:

R represents a monovalent organic group,

R¹ represents a bivalent organic group, with the proviso that these groups contain no reactive hydrogen such as contained in X, and X represents a group containing reactive hydrogen, with which said compound by reacting with acetyl chloride is capable of splitting off chlorine therefrom in the form of hydrogen chloride in the circumstances of the test A described hereinbefore, and wherein said compound at 15° C. has a solubility of no more than 5 g in 100 ml of water.

4. An X-ray image intensifying screen according to claim 2, wherein said organic metal salt is a metal carboxylate.

5. An X-ray image intensifying screen according to claim 2, wherein said organometal compound corresponds to the following formula:

$R_m SnX_{4-m}$ wherein:
R is a hydrocarbon group,
X is 1 to 3 electronegative substituents, and
m is 1, 2, or 3, excluding X being three, two, or one halogen atom(s) when m is 1, 2 or 3 respectively.

6. An X-ray image intensifying screen according to claim 2, wherein said organometal compound is a dialkyltin mercaptide or an organometal compound corresponding to any of the following general formulae:

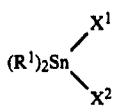

wherein:
$R^1$ represents an alkyl group,
each of $X^1$ and $X^2$, which may be the same or different, represents —O—CO—$R^2$ of —S—$R^3$, wherein $R^2$ is an alkyl group, and
$R^3$ is an alkyl group,

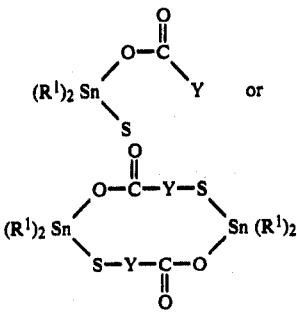

wherein:
$R^1$ has the same meaning as described above, and
Y represents an alkylene group.

7. An X-ray image intensifying screen according to claim 6, wherein said compound is dibutyltin maleate, dibutyltin lauryl mercaptide, dibutyltin S,S'-bis-(n-octylmercapto acetate), di-(n-octyl)-tin S,S'-bis(isooctylmercapto acetate) or dibutyltin β-mercaptopropionate.

8. An X-ray image intensifying screen according to claim 1, wherein the halide-free and non-hygroscopic phosphor particles consist of calcium tungstate, terbium-doped gadolinium oxysulfide, terbium-doped lanthanum oxysulphide or terbium-doped yttrium oxysulphide.

9. An X-ray image intensifying screen according to claim 1, wherein the halide-containing phosphor particles are at least partly rare-earth oxyhalide particles whose host metal is a rare-earth metal and whose activator metal consists of one or more other rare-earth metals.

* * * * *

UNITED STATES PATENT AND TRADEMARK OFFICE
CERTIFICATE OF CORRECTION

PATENT NO. : 4,180,740
DATED : December 25, 1979
INVENTOR(S) : Andre R. Suys et al It is certified that error appears in the above-identified patent and that said Letters Patent is hereby corrected as shown below:

In the Heading:

Under [30] Foreign Application Priority Data

Line that reads "Aug 31, 1977 [BE] Belgium ..... 56201"
   should read -- Aug 31, 1977 [BE] Belgium ..... 2/56201 --

Column 6, Lines 52-56, part of formula set forth as

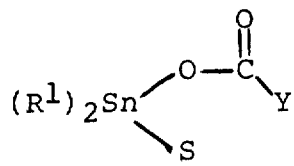   should read   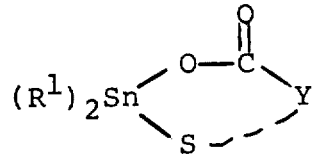

Column 15, Line 43 "20 (min)" should read -- 120 (min) --

UNITED STATES PATENT AND TRADEMARK OFFICE
CERTIFICATE OF CORRECTION

PATENT NO. : 4,180,740  
DATED : December 25, 1979  
INVENTOR(S) : Andre R. Suys et al Page 2 of 2

It is certified that error appears in the above-identified patent and that said Letters Patent is hereby corrected as shown below:

Column 18, Lines 2-6, Claim 6, part of formula set forth as

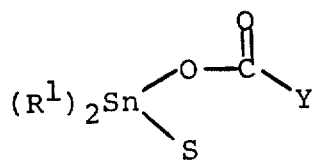    should read    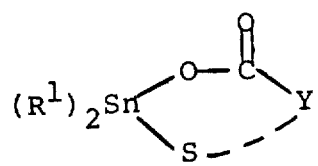

*Signed and Sealed this*

*Fifteenth* Day of *November 1983*

[SEAL]

Attest:

GERALD J. MOSSINGHOFF

*Attesting Officer*    *Commissioner of Patents and Trademarks*